United States Patent

Copeland, III

[15] 3,696,347

[45] Oct. 3, 1972

[54] SINGLE WALL DOMAIN INFORMATION TRANSFER ARRANGEMENT

[72] Inventor: John Alexander Copeland, III, Gillette, N.J.

[73] Assignee: Bell Telephone Laboratories, Incorporated, Murray Hill, Berkeley Heights, N.J.

[22] Filed: Sept. 8, 1971

[21] Appl. No.: 178,740

[52] U.S. Cl. ........................340/174 TF, 340/174 SR

[51] Int. Cl. ..........................G11c 11/14, G11c 19/00

[58] Field of Search ...................340/174 TF, 174 SR

[56] References Cited

UNITED STATES PATENTS

| | | | |
|---|---|---|---|
| 3,638,208 | 1/1972 | Chow | 340/174 TF |
| 3,641,518 | 2/1972 | Copeland | 340/174 TF |
| 3,646,530 | 2/1972 | Chow | 340/174 TF |
| 3,613,056 | 10/1971 | Bobeck et al. | 340/174 TF |

OTHER PUBLICATIONS

IBM Technical Disclosure Bulletin " Read/Write Control" by Walker, Vol. 13, No. 11, 4/71; pp. 3474, 3475.

IBM Technical Disclosure Bulletin, " Bubble Domain Logic Circuits" by Lin Vol. 13, No. 10, 3/71, pp. 3019, 3020.

IBM Technical Disclosure Bulletin, " Improvement of Data Rate In Cylindrical Domain Devices" by Genovese et al., Vol. 13, No. 11, 4/71, pp. 3299, 3300.

*Primary Examiner*—Stanley M. Urynowicz, Jr.
*Attorney*—R. J. Guenther et al.

[57] ABSTRACT

The transfer of information between single wall domain propagation channels in each of which information is represented by the side of a rail along which a domain moves is affected by a relay domain, the position of which is modified in accordance with information in one channel to change the side of the rail along which domains in the other move.

8 Claims, 3 Drawing Figures

SINGLE WALL DOMAIN INFORMATION TRANSFER ARRANGEMENT

FIELD OF THE INVENTION

This invention relates to data processing arrangements and more particularly to such arrangements in which information is represented as a pattern of single wall domains.

BACKGROUND OF THE INVENTION

The term "single wall domain" refers to a magnetic domain which is movable in a layer of suitable magnetic material and is encompassed by a single domain wall which closes on itself in the plane of that layer.

Propagation arrangements for moving a domain are designed to produce magnetic fields of a geometry determined by the layer in which a domain is moved. Most materials in which single wall domains are moved are characterized by a preferred magnetization direction, for all practical purposes, normal to the plane of the layer. The domain accordingly constitutes a reverse magnetized domain which may be thought of as a dipole oriented transverse, nominally normal to the plane of the layer. Accordingly, the movement of a domain is accomplished by the provision of an attracting magnetic field normal to the layer and at a localized position offset from the position occupied by the domain. A succession of such fields causes successive movements of a domain.

One suitable propagation arrangement for moving a domain comprises a pair of serpentine conductors aligned along an axis and offset from one another therealong to provide domain displacement along the axis when pulsed alternatively with bipolar pulses. My copending application Ser. No. 49,273 filed June 24, 1970 now U.S. Pat. No. 3,636,531 discloses one such arrangement where serpentine conductors define a multistage domain propagation arrangement. A rail along the above-mentioned axis defines first and second stable positions for a domain to first and second sides thereof in each of the stages. A domain is moved along the rail in response to the pulses in the conductors without changing sides. In practice, the rail forms a closed loop and a domain is stored initially in each stage to a reference (zero) side of the rail. A binary one is stored by displacing a domain laterally from the reference side to the paired position at an input stage of the channel leaving an absent domain in the reference side. A logical consequence of the arrangement is that a domain to the "one" side of the rail is accompanied by an absent domain in the reference side as it moves about the channel. Of course, the opposite is true also.

A mass memory which capitalizes on the unique capabilities of single wall domains to move in any direction in the plane of the host layer is described in the copending application Ser. No. 875,338 filed Nov. 10, 1969 now U.S. Pat. No. 3,618,054 for P. I. Bonyhard, U. F. Gianola, and A. J. Perneski. The mass memory is organized on the basis of a single major information loop aligned with one axis of the host layer and a plurality of minor loops extending outwardly from the major loop along the perpendicular axis of the layer. Information is stored normally as domain patterns in the minor loops for transfer, on command, to the major loop where sense operations occur prior to restoration of information to the originating loops.

A problem occurs in the adaptation of closed loop lateral displacement (rail) arrangements to this major-minor mass memory organization because of the close spacing between the major and minor loops. Since rail type major and minor loops are closed and since information is represented by the side of the rail along which domains move, domains are not actually transferred to the major loop. Rather, transfer of information between loops occurs by domain interaction. Consequently, the spacings between various minor loops and the major loop is small to permit domain interaction. Interaction occurs between domains in only active loops. Since the lateral displacement arrangement is driven by a pulsed electrical conductor, a selected minor loop can be driven for transfer of information to, for example, a synchronously driven major loop. But if the remaining (nonselected) minor loops are positioned normally to permit interaction between domains therein (when driven) and such a major loop, then non-driven minor loops also have domains normally positioned to interfere with information propagating in that major loop.

BRIEF DESCRIPTION OF THIS INVENTION

The problem is resolved in accordance with this invention by extending one stage of the drive conductor associated with each minor loop to encompass a relay domain fixed in a position, between the minor loop and the associated stage of the major loop, where bipolar pulses in the conductor are normally not operative to move it. Domains on an information side of the rail in the active minor loop offset the relay domain to an active position from which the relay domain is displaced further by a current of a first polarity in the drive conductor. The relay domain in only a selected minor loop thus moves to a position to interact with and thus produce a rail crossing of a domain in the major loop prior to being restored to the original (neutral) position by the next consecutive oppositely poled pulse in the selected drive conductor.

DETAILED DESCRIPTION

Figure 1:
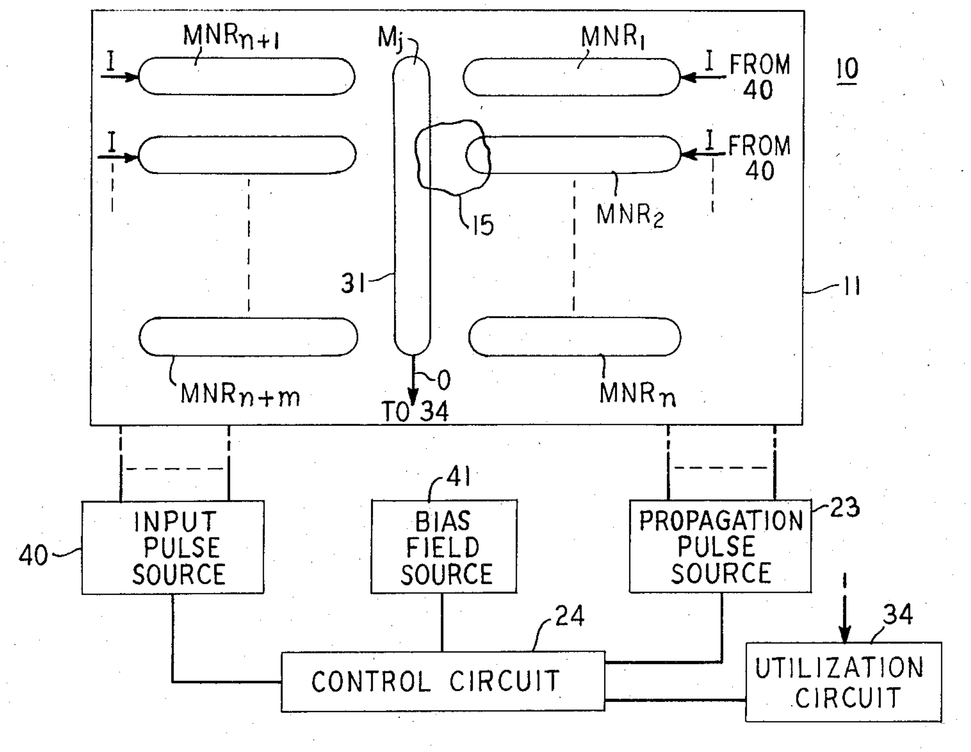
FIG. 1 is a schematic representation of a single wall domain arrangement in accordance with this invention.

FIG. 1 shows a single wall domain mass memory arrangement 10. The arrangement includes a layer of material 11 in which single wall domains can be moved and a plurality of closed loop domain propogation channels in a major-minor organization of the type disclosed in the above-mentioned copending application of P. L. Bonyhard et al.

The major-minor organization is represented in FIG. 1 by the familiar closed loop line MJ, having its long dimension oriented vertically, and a plurality of closed loop lines MNR1———MNRn and MNRn+1——— MNRn+m arranged to the right and to the left of loop MJ in groups, as viewed. Loop MJ represents the major recirculating loop which serves as a temporary store for advancing information transferred to it and from the minor loops for detection at an output position represented by arrow O. The minor loops store information on a relatively permanent basis for transfer to the major loop when an output operation is to be carried out. The overall organization of the major-minor loops and the read operation thereof is well understood in the art. Accordingly, that organization is discussed further herein only to the extent necessary to provide a context for the arrangement for transferring information from a minor to a major loop in accordance with this invention.

Figure 2:
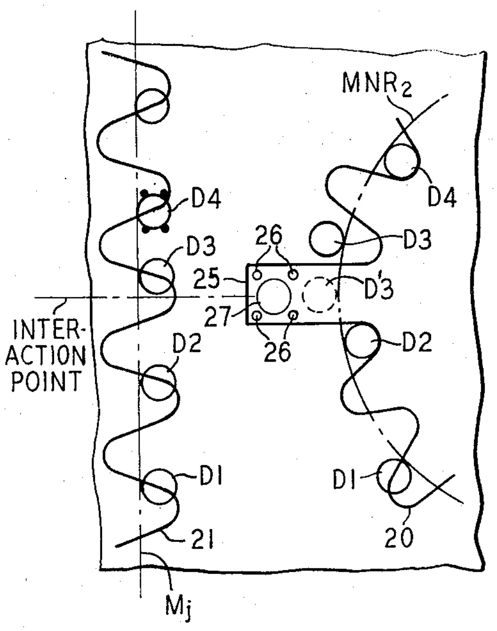
FIGS. 2 and 3 are schematic representations of a portion of the arrangement of FIG. 1 showing the magnetic conditions therein during operation.
Figure 3:
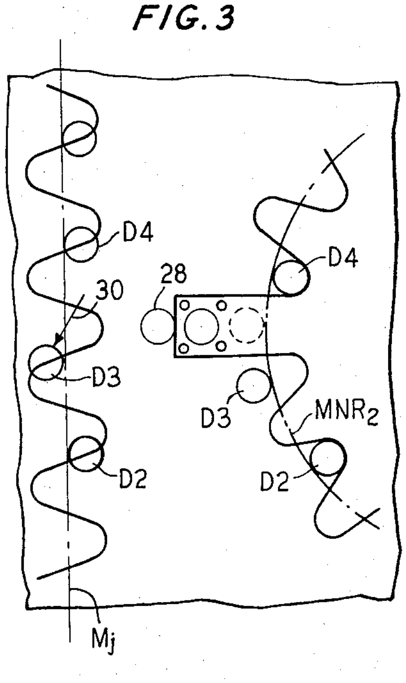

That transfer arrangement is located in the area between each minor loop and the associated portion of the major loop — an area represented at 15 in FIG. 1 and shown in detail in FIGS. 2 and 3.

FIG. 2, specifically, shows portions of minor loop MNR2 and major loop MJ where the two loops are most closely spaced for defining an interaction point for the transfer of information. The two loops are represented in FIG. 2 by broken lines which approximate the axis of domain movement in each and which are designed by the loop designations in the figure.

Serpentine conductors follow the axis of the loops to generate appropriate drive fields for moving the domain patterns when pulsed. Typically, the conductors in each instance are generally sinusoidal in shape, two being employed, in each instance, displaced from one another along the axis of the loop and pulsed alternatively first with pulses of a first polarity followed by pulses of the opposite polarity for achieving unidirectional movement of domains along the loop axis. Alternatively, one conductor is replaced by magnetically soft dots (see dots above domain D4 in FIG. 2) offset with respect to the period of the remaining conductor to offset a domain along the axis from the position to which pulses on the remaining conductor move it. Whatever the drive mode, conductors 20 and 21 in FIG. 2 represent the drive arrangement for loops MNR2 and MJ. The conductors are connected between a propogation pulse source 23 and ground and are operative under the control of a control circuit represented by block 24 of FIG. 1.

FIG. 2 also shows a modification of the sinusoidal form of conductor 20 at the area where loops MJ and MNR2 are most closely spaced. The modified portion 25 can be seen to be generally rectangular, illustratively, extending even closer to loop MJ and encompassing four high permeability dots 26. It is helpful to recall that in lateral displacement arrangements, domain patterns are motionless until the associated drive conductors are activated. Consequently, domains D1, D2, etc., of each of channels MNR2 and MJ may be assumed to occupy statistic positions as shown in FIG. 2 until conductors 20 and 21 are pulsed.

The transfer of information from loop MNR2 to loop MJ will now be explained and it will be seen that transfer occurs between a selected minor loop and the major loop with only negligible interference between domain patterns in nonselected minor loops because of the modified portions of the drive conductors of each minor loop and the presence of a relay domain shown at 27 in FIG. 2.

The relay domain in each loop is maintained in a prescribed (neutral) position by dots 26 such that pulses in conductor 20 are not operative on the domain. The position is such that the wall of the domain is tangent to the center line of conductor 20 at portion 25. This neutral position is explained fully in my copending application Ser. No. 159,983 filed July 6, 1971. When a relay domain occupies a neutral position, it is not operative to transfer information because it is not sufficiently close to interact with domains moving downward along the right side of the axis MJ. Since the relay domain occupies a neutral position in each nonselected minor loop, it is clear that it interferes only negligibly with information being moved, for example, clockwise in loop MJ of FIG. 1.

Transfer of information between loops, on the other hand, occurs when a relay domain is displaced from its neutral position to an active position partially beneath the portion 25 of conductor 20. Movement to such an active position, in turn, occurs, for example, when a domain D3 to the left side of axis MNR2 in FIG. 2 moves to a position represented by broken circle D'3 in a normal domain propagation operation. The separation between the neutral position and the position occupied by domain D'3 in FIG. 2 is about two domain diameters. Consequently, when a domain is moved to a position D'3, repulsion forces which exist between domains are operative to offset the relay domain at 27 beneath conductor 20.

The first pulse of a first polarity in conductor 20 which is operative to move domain D3 to position D'3 in FIG. 3 is followed by a second pulse of opposite polarity. The second pulse moves domain D3 along axis MNR2 to the portion shown in FIG. 3 and simultaneously operates to displace the relay domain to position 28 also shown in FIG. 3.

Meanwhile conductor 21 is being pulsed synchronously in a like manner. The first pulse in conductor 21 is operative to move domain D3 along the right (reference) side of axis MJ to the position shown in FIG. 2. The following second pulse advances domain D3. But the relay domain is now positioned to interact with domain D3 of loop MJ and causes the latter domain to cross the axis of the loop to the position shown in FIG. 3.

Arrow 30 in FIG. 3 represents the movement of domain D3 into the interaction point in this instance. When it is recognized that the axis as represented in FIGS. 2 and 3 coincides with the "rail" of a lateral displacement loop, it may be appreciated that a rail crossing is achieved by the interaction and that a change in information results. It is to be noted that interaction and thus information transfer occurs only between the major loop and a selected minor loop in which a relay domain is displaced by information being moved along the left side of the rail of the minor loop (i.e., a binary one) as shown in FIGS. 2 and 3. It is only in such an active minor loop that the relay domain is displaced for movement by the drive pulses (in conductor 20) to an interactive position (28). If domains to the right side of axis MJ in FIGS. 2 and 3 are taken to represent binary zeros, a rail crossing due to such an interaction, produces a binary one in the major loop on a nondestructive basis (viz., without destroying the information in the minor loop). An offset in the rail at 31 in FIG. 2 ensures that domains are returned to the outside (reference) side of the rail as described in the first of my above-mentioned copending applications.

The termination of the second pulse in conductor 20 results in an offset of the relay domain to the right as viewed in FIG. 3 to a stable position from which it is returned to its position in FIG. 2 in response to a next subsequent pulse in conductor 20.

In the above manner, information stored in a minor loop is transferred to a major loop, synchronously operated, to move domains to a detection position represented by arrow O in FIG. 1. Typically, a magnetoresistive element or a conducting loop operates to detect a passing domain in a well-understood manner and to apply a signal representative of the domain to a utilization circuit represented by block 34 in FIG. 1 under the control of control circuit 24. The output position conveniently coincides with a binary one position to the inside of the rail of loop MJ.

The transfer arrangement has been described in the context of a major-minor mass organization in order to illustrate the decoupling achieved by the relay domain arrangement for nonselected minor loops. It is particularly clear in this context that transfer only in one direction, from the minor to the major loop, is necessary because operation is on a nondestructive read basis.

Information is written into individual minor loops at input positions represented by an arrow I for each minor loop in FIG. 1. A variety of techniques are suitable for the input of information. Individual conductors, for example, are suitable to this end. The input conductors, also taken to be represented by arrows I, are connected to an input pulse source represented by block 40 in FIG. 1 operative under the control of control circuit 24.

During operation, domains are maintained at a prescribed diameter by a bias field supplied typically by an external source represented by block 41 in FIG. 1.

What has been described is considered only illustrative of the principles of this invention. Therefore, various modifications thereof can be devised by one skilled in the art within the spirit and scope of this invention.

What is claimed is:

1. A magnetic domain arrangement comprising a layer of material in which single wall domains can be moved, means for moving single wall domains in first and second propogation channels through first and second transfer stages in said first and second channels, respectively, said transfer stages being spaced apart a distance such that the presence of a domain in each results in only negligible interaction effects, means for defining a relay position for a single wall domain intermediate said first and second transfer stages, said means for moving domains in said first channel being adapted to move said relay domain in a manner to alter the movement of a domain in said second transfer stage only when a domain is moved into said first transfer stage.

2. An arrangement in accordance with claim 1 wherein each of said first and second channels comprises a lateral displacement domain propagation arrangement.

3. An arrangement in accordance with claim 2 wherein each of said first and second channels is a closed loop for recirculating information therein.

4. An arrangement in accordance with claim 3 wherein said means for moving comprises first and second serpentine conductors adapted for moving domains along a first or second side of a rail in each of said first and second channels, respectively.

5. An arrangement in accordance with claim 4 wherein said first conductor comprises a geometry modified at said transfer position to include said relay position.

6. An arrangement in accordance with claim 5 wherein said relay position includes a single wall relay domain and a plurality of magnetically soft dots for fixing the position of said relay domain with respect to said first conductor such that said relay domain is normally not affected by a pulse in said conductors.

7. An arrangement in accordance with claim 6 wherein said transfer stage comprises a first position to said first side of said rail in said first channel and is spaced apart from said relay position a distance such that a domain moved into said first position by a pulse in said first conductor offsets said relay domain to a position where a pulse in said first conductor is operative to move said relay domain further in a manner to interact with and thus alter the course or a domain synchronously moved along the second side of the rail in said second channel.

8. A magnetic domain arrangement comprising a layer of material in which single wall domains can be moved, means for defining in said layer first and second multistage channels for said domains, each of said channels including a rail for defining first and second stable positions for a domain in each of said stages, said channels being disposed in close proximity at a transfer stage such that a first domain to a first side of said rail of said first channel is closely spaced from a second domain to a first side of said rail in said second channel said first and second domains being separated by an intermediate position and normally having only negligible effect on one another, means for defining a stable position for a relay domain in said intermediate position, said relay domain being displaced towards said second domain by said first domain, and an electrical conductor arrangement for advancing information in said first channel, said arrangement comprising conductor loops corresponding to said stages and including at said transfer stage an elongated loop encompassing said relay domain in a manner such that only a displaced relay domain is moved by a pulse therein to a position to interact with said second domain to cause said second domain to cross said rail in said second channel.

* * * * *